(12) United States Patent
Yale (10) Patent No.: US 9,616,579 B2
(45) Date of Patent: Apr. 11, 2017

(54) LIFTING GRIP

(71) Applicant: Thomas L. Yale, West Boothbay Harbor, ME (US)

(72) Inventor: Thomas L. Yale, West Boothbay Harbor, ME (US)

(*) Notice: Subject to any disclaimer, the term of this patent is extended or adjusted under 35 U.S.C. 154(b) by 0 days.

(21) Appl. No.: 14/893,583

(22) PCT Filed: Jul. 20, 2015

(86) PCT No.: PCT/US2015/041139
§ 371 (c)(1),
(2) Date: Nov. 24, 2015

(87) PCT Pub. No.: WO2016/073040
PCT Pub. Date: May 12, 2016

(65) Prior Publication Data
US 2016/0297077 A1    Oct. 13, 2016

Related U.S. Application Data

(60) Provisional application No. 62/074,450, filed on Nov. 3, 2014.

(51) Int. Cl.
*B66C 1/12* (2006.01)
*B25J 15/00* (2006.01)
*B66F 19/00* (2006.01)

(52) U.S. Cl.
CPC ....... *B25J 15/0038* (2013.01); *B25J 15/0019* (2013.01); *B66C 1/12* (2013.01); *B66F 19/00* (2013.01)

(58) Field of Classification Search
CPC ..... B25J 15/0038; B25J 15/0019; B66C 1/12; B66C 1/18; B66F 19/00; D07B 1/00; F16G 11/02
USPC ................................................ 294/74, 86.42
See application file for complete search history.

(56) References Cited

U.S. PATENT DOCUMENTS

| | | | |
|---|---|---|---|
| 2,602,207 A * | 7/1952 | Kellems | H02G 1/081 |
| | | | 24/583.11 |
| 4,293,157 A | 10/1981 | Fidrych | |
| 4,354,705 A * | 10/1982 | Shorey | F16G 11/00 |
| | | | 24/115 N |
| 2014/0239622 A1 | 8/2014 | Yamataki | |

FOREIGN PATENT DOCUMENTS

| | | |
|---|---|---|
| JP | 1989-194808 | 8/1989 |
| JP | 2000-185484 | 7/2000 |
| JP | 2004-135420 | 4/2004 |

* cited by examiner

*Primary Examiner* — Gabriela Puig
(74) *Attorney, Agent, or Firm* — Jeffrey Joyce; Patricia Mathers (57) ABSTRACT

A grip for cylindrical or elongated elements, such as an umbilical cable. The system includes a mesh fabric that is created by interwoven lines that are initially laid out in a flat rectangular or trapezoidal shape. The mesh fabric is wrapped around the object to be gripped. A lifting eye is integrated into one end of the mesh. The grip is closed by a series of interlocking loops that create a sort of daisy-chain closure.

11 Claims, 9 Drawing Sheets

LIFTING GRIP

BACKGROUND INFORMATION

Field of the Invention

The invention relates to the field of grips that are used for lifting, pulling, stopping and deployment of objects, particularly heavy objects that are cylindrical in shape, such as umbilical cable, drill pipe, production pipe, power cables etc. More particularly, the invention relates to grips used for such objects in the offshore oil industry.

Discussion of the Prior Art

Umbilical cable, referred to simply as "umbilicals" in the industry, are used in oil and gas operations to provide the necessary control systems, electrical and/or hydraulic power, etc., to the various operations. An umbilical in this type of operation is typically a large cable that encases a plurality of cables or lines, such as flow lines for providing hydraulic fluids and/or chemicals, electrical cables that provide power and controls, and telecommunications cables. The various types of lines and cables may be integrated into a single umbilical or may be provided as separate umbilicals.

The umbilicals reach from the surface, i.e., from a ship or a platform, down to the operation and, thus, may be kilometers long, depending on the depth of the operation. Accordingly, an umbilical being placed into operation weighs many thousands of pounds, which provides a challenge. Conventional gripping systems for an umbilical include a Chinese-finger type grip, such as the grip sold under the band name YALE GRIP. This type of grip includes a plurality of very high tensile rope tails or braids that are integral to a lifting eye at one end and that are individually and contra helically wrapped around the umbilical, such that a grip is formed around the cable. The grip functions as a Chinese finger: when tension is applied to the eye of the grip in the axial direction, the grip extends in length and narrows in the radial direction, thereby creating a firm grip on the umbilical over the length of the applied grip. This type of extended textile grip does not scar or permanently deform the object being lifted.

Often, the size or diameter of an umbilical or pipe may be large and many tons of lifting capacity may be required. One of the drawbacks of the conventional grip is that the rope tails have to be very long (50 to 100 feet or more) to wrap the object, and this requires a significant amount of time, often a number of hours, physical space, and man power to apply the grip and subsequently remove it.

What is needed, therefore, is a grip that can be quickly and easily assembled on the object and subsequently easily removed while also being a grip that is safe and that provides the necessary lifting strength.

BRIEF SUMMARY

The grip according to the invention may be used to grab many different types of cylindrical or longitudinal elements such as conduit, large ropes, cable, conductor, hose, or pipe, but was developed to grip umbilical cable that is typically used in the oil industry. Reference is made in the description of the inventive grip to an "umbilical cable" and to a "cable grip", but these terms are used for ease of explanation. It is understood that the use of the term "umbilical" is not limiting and that the grip according to the invention may be used to grab other types of elements.

The grip according to the invention is a mesh fabric. The fabric is initially a flat rectangular and/or trapezoidal shape that is wrapped around the umbilical. The two edges that extend in the axial direction of the umbilical are then closed to form a grip around the cable. The mesh fabric has a weave that allows the grip to function like a "Chinese finger," i.e., when tension is applied to the lifting eye of the grip in the axial direction, the mesh fabric of the grip narrows in the radial direction, thereby providing a secure grip on the umbilical. The closure is a daisy-chain type closure that is simple in its construction, yet strong and secure and that is quickly created on an umbilical and is also quickly removed. A preferred embodiment of the grip is constructed of various synthetic materials, but may be fabricated from a wide variety or combination of materials, including, but not limited to, metals, organic material, or any material possessing tensile strength for either the mesh fabric or closure material.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1A:
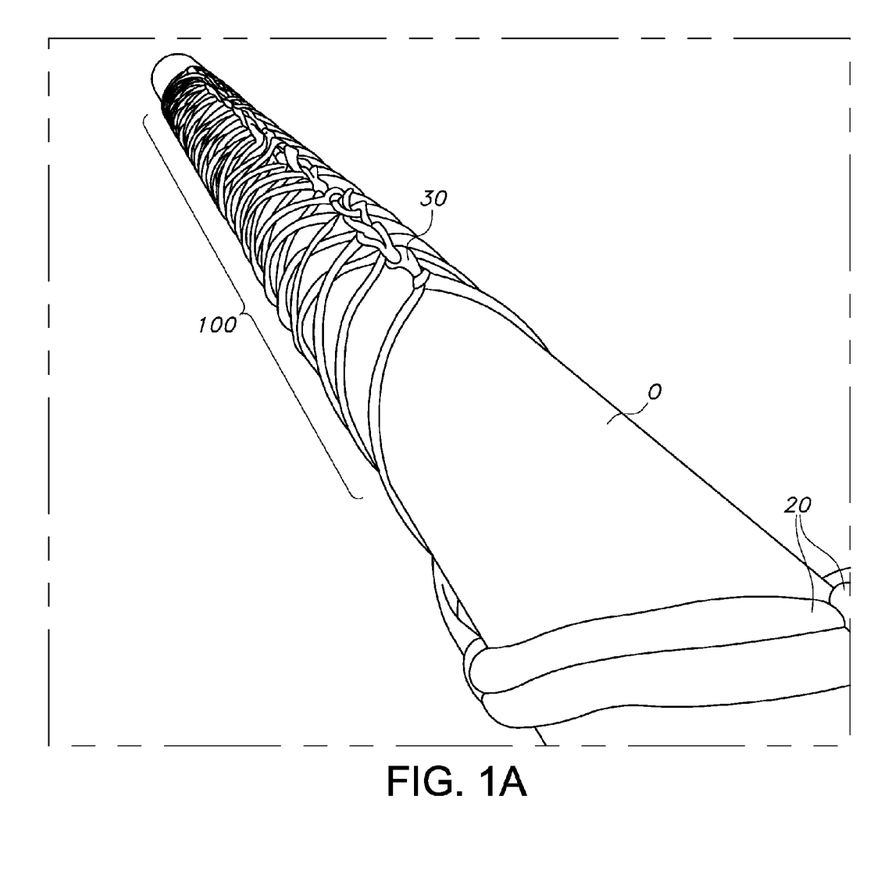
FIG. 1A shows the grip according to the invention, assembled on a cable and shown from the lifting end.
Figure 1B:
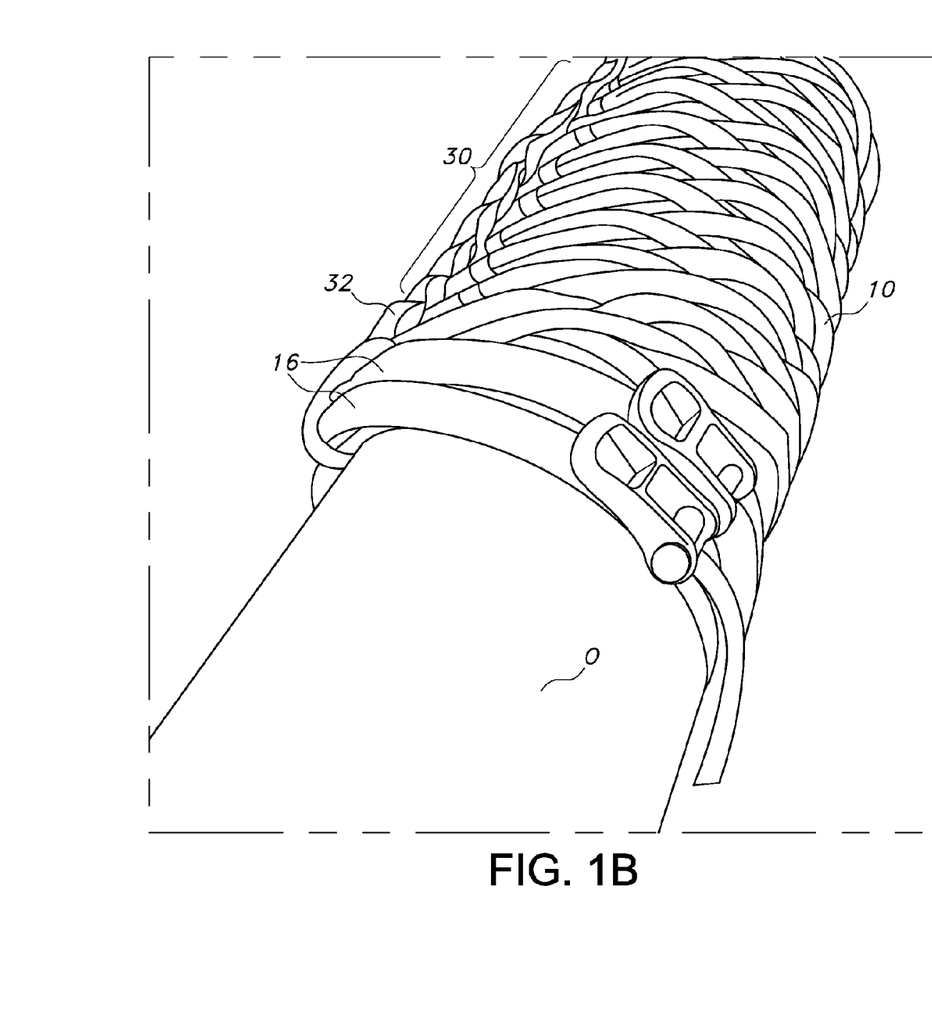
FIG. 1B shows the grip of FIG. 1A, from the tail end.
Figure 2A:
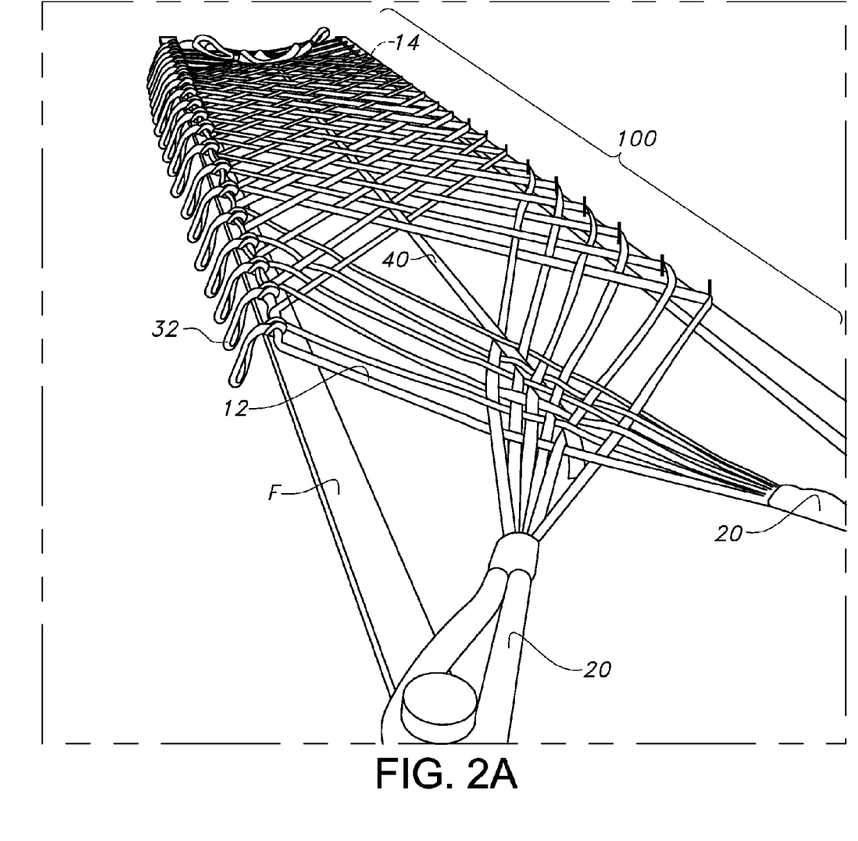
FIG. 2A is a perspective view of one embodiment of the grip, laid out flat on the frame that is used to fabricate the grip, looking from the lifting end toward the tail end, and showing particularly the weave, the lifting eyes, independent closure loops, and the geometry stabilizing element.
Figure 2B:
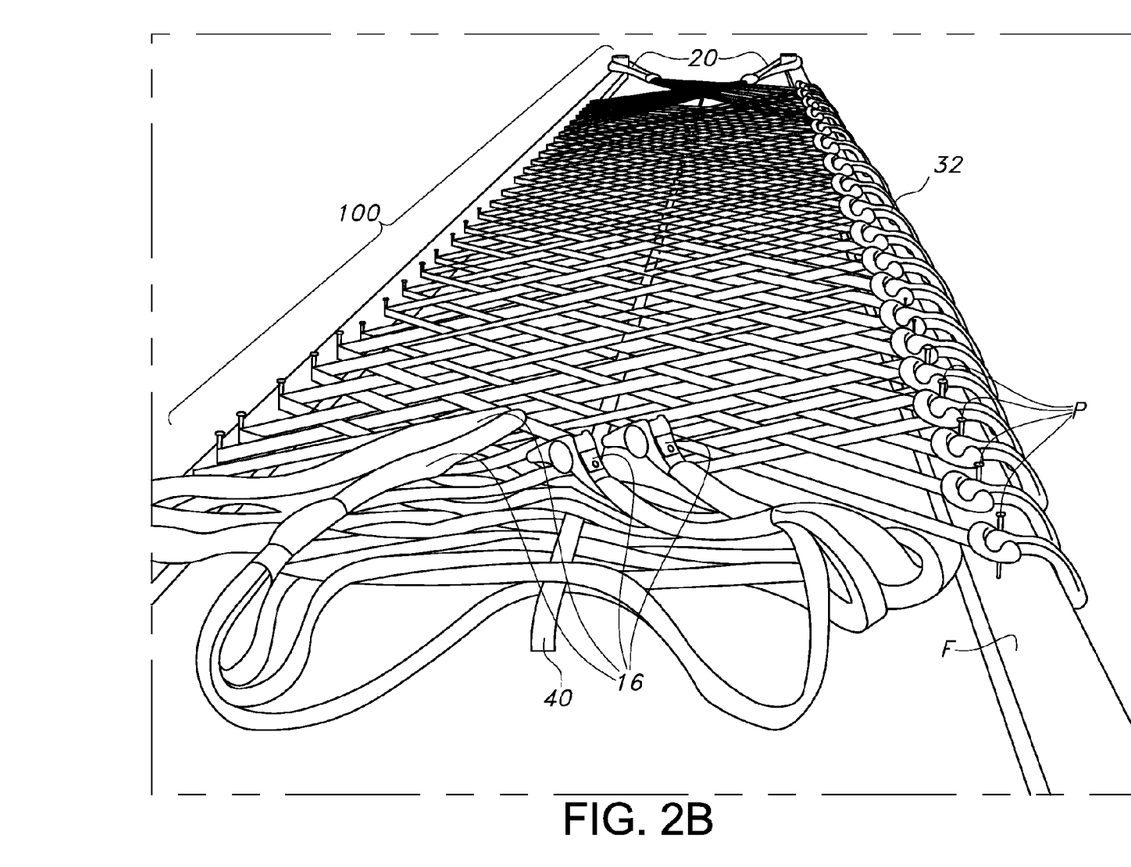
FIG. 2B is a perspective view of the grip shown in FIG. 2A, looking from the tail end and showing an optional tail closing treatment.

FIGS. 1A and 1B illustrate an umbilical grip 100 according to the invention that has been wrapped around a long object O that is to be lifted, supported, or held, such as an umbilical cable, so as to form a gripping sleeve. FIGS. 2A and 2B show the grip 100 after it has been fabricated on a frame F. The cable grip 100 comprises one or more lifting eye 20, a closure 30, and a geometry stabilizing element 40. The end of the grip 100 with the lifting eye 20 is referred to hereinafter as the lifting end, and the other end the tail end. The grip 100 is formed from lines 12 that are integral to the eye 20 and that are interwoven to form a flat mesh fabric 14 that has a top edge that is at the lifting end, a bottom edge at the tail end, and two closure sides 10A, 10B, shown in FIG. 3, that extend from the lifting end to the tail end. The closure sides 10A, 10B are the edges that extend in the axial direction of the umbilical or object O that is to be lifted, supported, or held.

The lines 12 are interwoven to form the mesh fabric, but each line is movable relative to each other. This type of weave creates a fabric that is dimensionally changeable. Thus, when the closure sides 10A, 10B are connected, the grip 100 is closed and forms a sleeve around the object O and, in its relaxed state, i.e., without tension applied to it, the grip will have approximately a length that is determined by the length of the geometry stabilizing element 40. Applying tension to the grip at the lifting end, for example, by lifting the object O by the one or more lifting eyes 20, causes the individual lines 12 in the weave to try to align in the axial direction. This, in turn, causes the diameter of the grip to constrict, which results in the grip 100 gripping the object tightly.

The cable grip 100 is applied to the object O, i.e., the umbilical, as follows: The grip 100 is placed around the umbilical O in a position for closing around the umbilical. The geometry stabilizing element 40, best seen in FIGS. 2A and 2B, is an elastic element that holds the fabric of the grip 100 to a desired length while it is being assembled on the umbilical, so as to enable one to work the daisy-chain or zip closure described below. Optionally, a suitable number of auxiliary fasteners (not shown) may be used to temporarily hold the grip in place to facilitate working the closures 30. These auxiliary fasteners may simply be strips of hook-and-loop fabric fasteners, which are used to intermittently connect closure edges 10A, 10B, thereby temporarily securing the position of the grip 100 on the umbilical.

FIGS. 3-8 illustrate details of the closure 30, which is a daisy-chain or zip-type system that is essentially a series of interlocking loops 32 that are worked along the closure edges 10A, 10B of the grip 100. There are a number of embodiments of the zip closure, but common to all embodiments is lacing the series of closure loops 32 along the closure edges, such that a closure loop is long enough to reach from edge 10A across to the opposing edge loop on edge 10B and then longitudinally to the next adjacent edge loop of side 10B, where the closure loop is then interlocked with the next closure loop from side 10A. This process is then repeated all the way down the closure edges. In this way, each first loop is securely held in place by the second loop, thereby creating a closure that is secure, but, on the other hand, "unzips" easily when the bottom-most loop is released.

Figure 3:
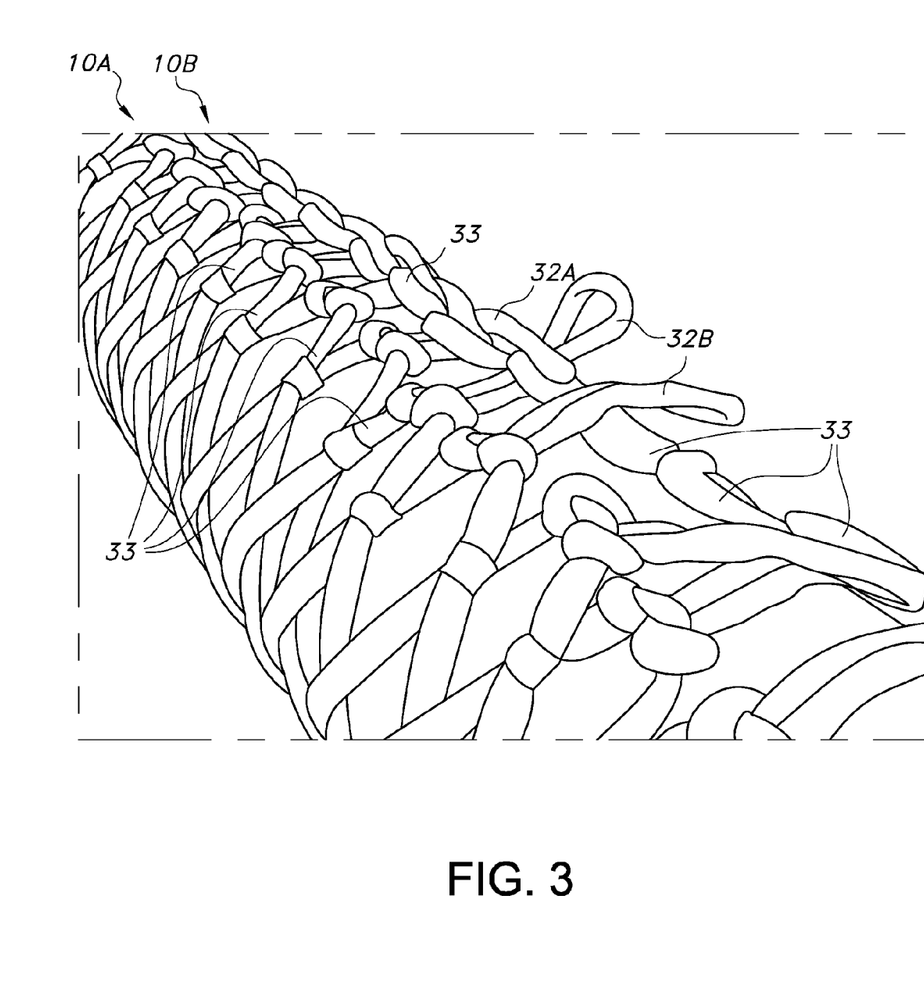
FIG. 3 illustrates the grip being wrapped on a simulated umbilical, with the daisy-chain closure being created.
Figure 4:
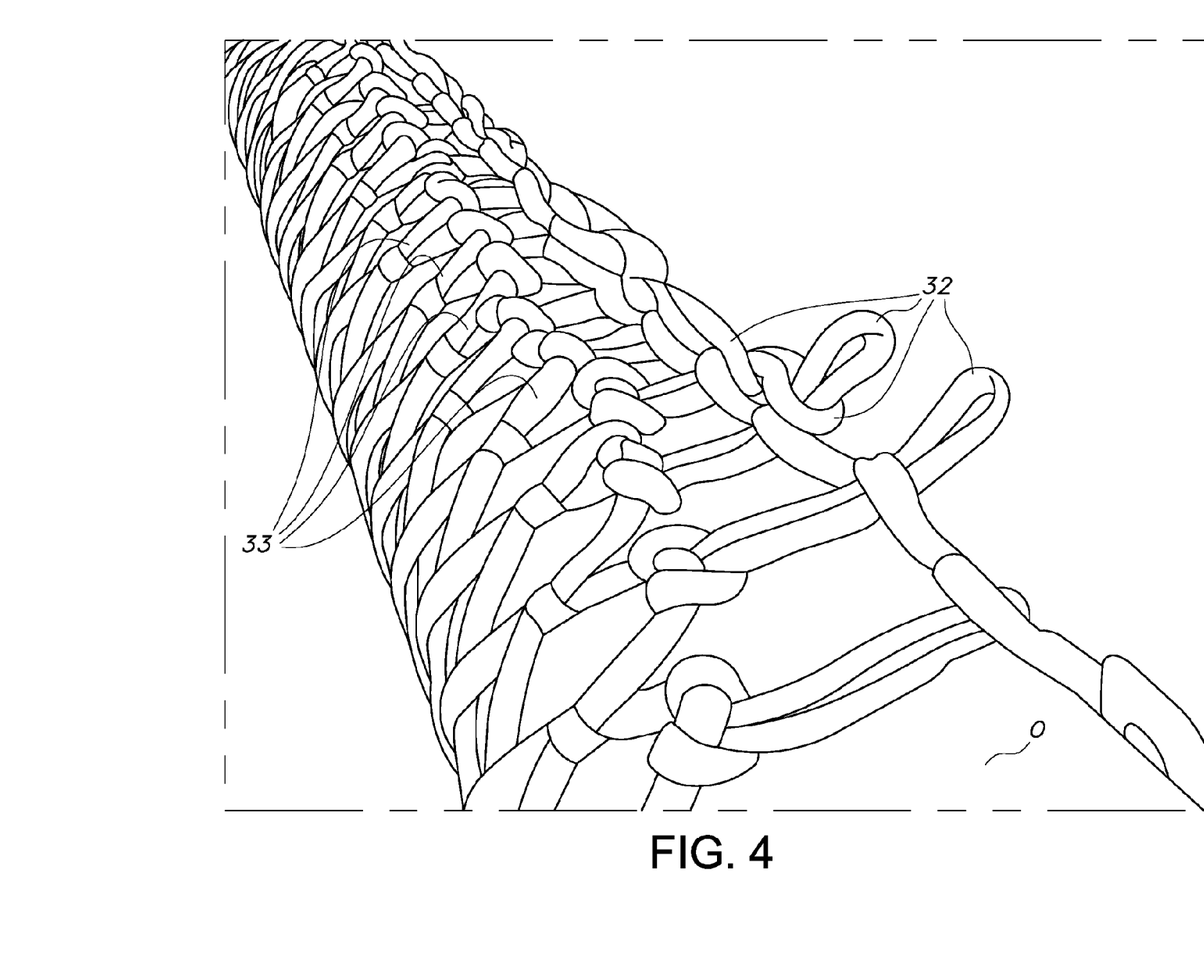
FIG. 4 illustrates closure loops being interlocked to a daisy-chain closure.

FIGS. 3, 4, 7 and 8 illustrate an embodiment, in which the series of closure loops 32 comprises a series of individual flexible rings. Referring particularly to FIGS. 3 and 4, one can see that the first and second closure edges 10A, 10B, respectively, are formed such that each edge has a series of "grab loops" 33 and looking in the longitudinal direction, one can see that, for each grab loop 33 on the first closure edge 10A, there is a mating grab loop 33 on the second closure edge 10B that is at approximately the same distance longitudinally. A closure loop 32 has been looped around each of the grab loops 33 on the first closure edge 10A. To lace up the closure 30, a first closure loop 32A is pulled through the mating grab loop 33 on the second closure edge 10B and, if the particular loop is not the first loop in the series, through a preceding closure loop, and is then pulled down toward an adjacent, second closure loop 32B and slipped over that second closure loop. The process is repeated with this second closure loop and so on, down the length of the closure edge. FIG. 1B shows cable grip 100 from the tail end and shows that straps or tails 16 are threaded through the last closure loop 32 to complete the closure 30, thereby securing the closure lacing.

Figure 5:
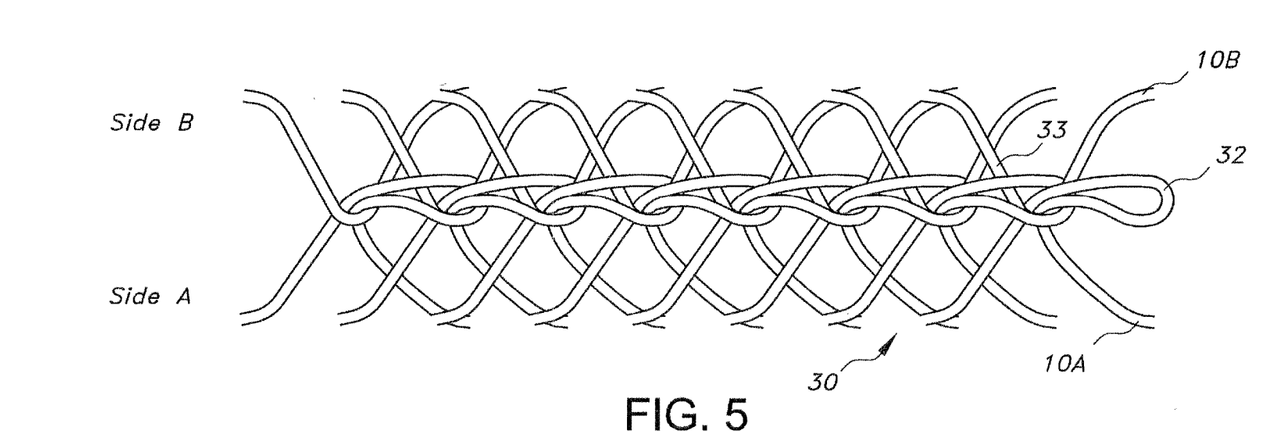
FIG. 5 is a first embodiment of the daisy-chain closure, with the closure loops as an integral part of the weave material of the grip.

FIG. 5 shows a closure device 30 that is formed from the mesh fabric of the grip 100, rather than comprising one or more separate components. SIDE A, for example, has a first closure edge in which the grab loops are now much longer than described above with reference to FIGS. 3, 4, 7 and 8, and now serve as the closure loops 32. The process of threading one closure loop through a mating grab loop on the second closure edge and then over an adjacent closure loop remains the same. The weave of the mesh fabric of grip 100 desirably progresses from a low angle relative to the axis of the umbilical at the lifting or eye end to a much higher angle at the tail end. Consequently, the longitudinal distance between edge grab loops 33 decreases progressively from the eye end to the tail end. If the mesh fabric of the grip 100 is constructed as a rectangle, the closure loops 32 of edge side 10A correspondingly decrease in length to match the decreasing distance between adjacent edge grab loops. Alternatively, the mesh fabric of the grip 100 may be constructed as a trapezoid in such a way that, when wrapped around umbilical O, the distance or gap between closure edges 10A and 10B increases in direct proportion to the decrease in longitudinal distance between adjacent edge grab loops, such that the length of the closure loops 32 remains constant from the eye end to the tail end of grip 100. The final closure loop at the tail end may be longer to accommodate the grip or mesh material tails.

Figure 6:
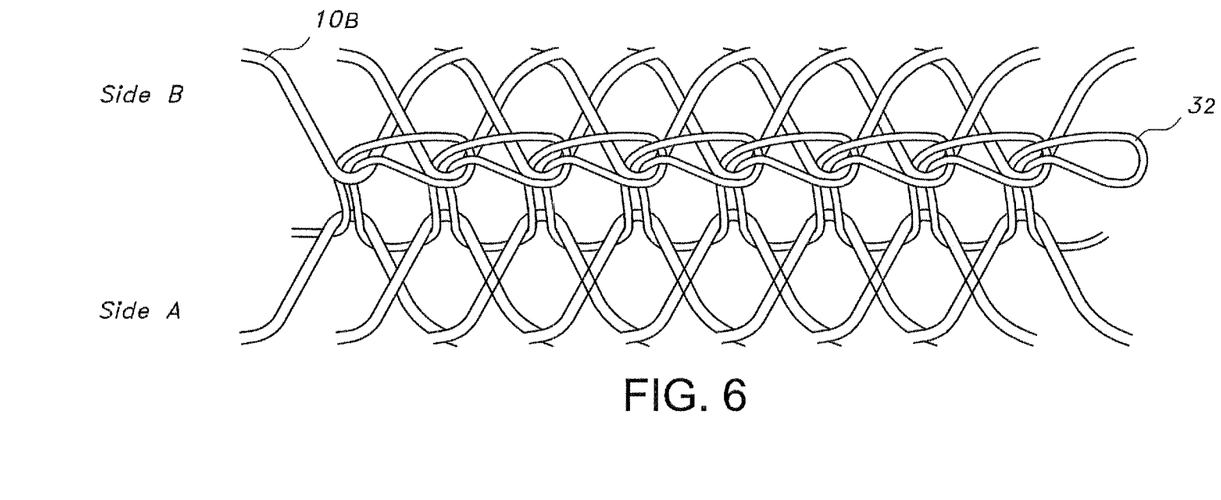
FIG. 6 is a second embodiment of the daisy-chain closure, wherein the closure device is a component separate from the weave material of the grip.

FIG. 6 illustrates an embodiment in which the closure device 30 is a separate long component that is laid out along the first closure edge and pulled through each of the mating grab loops on the first closure edge, so as to form a long closure loop, which is then worked the same as the closure loops described above.

Figure 7:
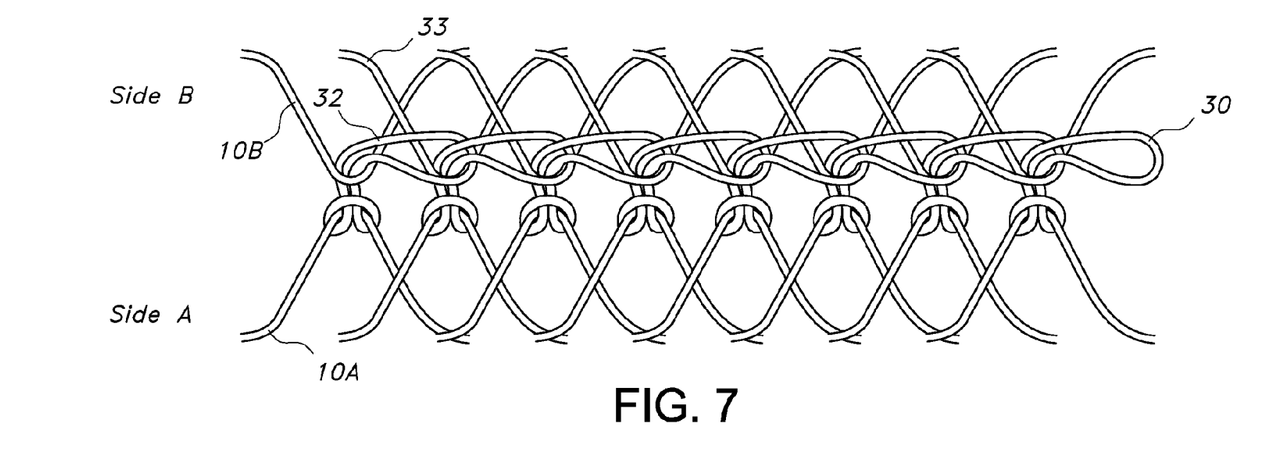
FIG. 7 is a third embodiment of the daisy-chain closure comprising a series of separate closure loops.

FIG. 7 illustrates an embodiment in which the closure device 30 comprises separate closure loop components 32 of greater or lesser strength than the mesh material. These closure loop components 32 are laid out along and attached to the first closure edge and are worked the same as the closure loops described above in FIG. 5. These separate or independent closure loops may be configured to be replaceable or not. They may also be lengthened or shortened to accommodate a variation in the circumference or girth of the umbilical O or element on which the grip is be used. The weave of the mesh fabric of grip 100 desirably progresses from a low angle relative to the axis of the umbilical at the lifting or eye end to a much higher angle at the tail end. Consequently, the longitudinal distance between each adjacent edge grab loop 33 decreases progressively from the lifting or eye end to the tail end. If the mesh fabric of the grip 100 is constructed as a rectangle, the closure loops 32 of edge side 10A correspondingly decrease in length to match the decreasing distance between adjacent edge grab loops. Alternatively, the mesh fabric of the grip 100 may be constructed as a trapezoid in such a way that, when wrapped around umbilical O, the distance or gap between closure edges 10A and 10B increases in direct proportion to the decrease in longitudinal distance between adjacent edge grab loops, such that the length of the closure loops 32 remains constant from the eye end to the tail end of grip 100. The final closure loop 32 at the tail end may be longer to accommodate the grip or mesh material tails 16.

Figure 8:
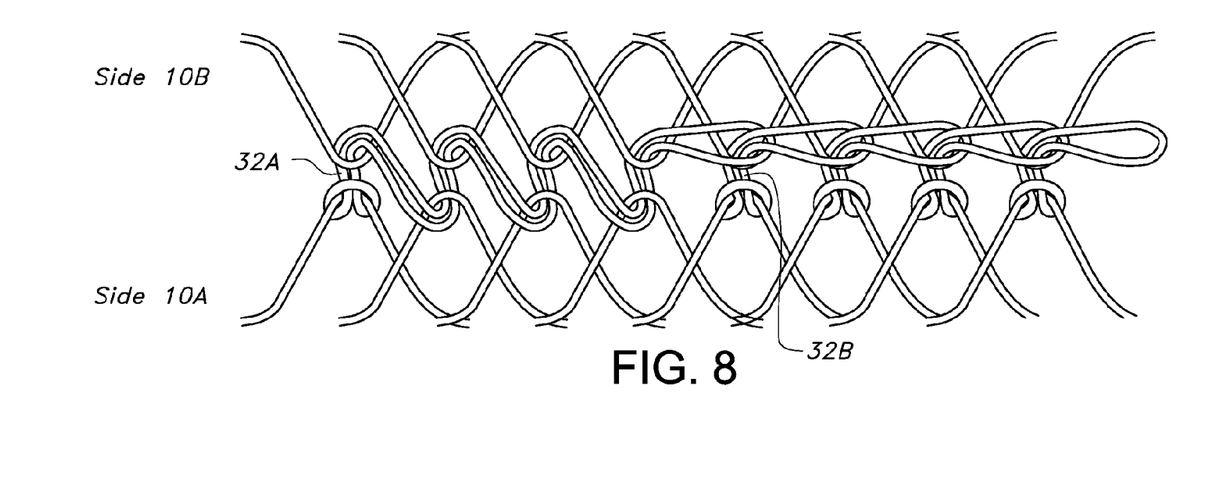
FIG. 8 is a fourth embodiment of the daisy-chain closure comprising a plurality of separate closure loops and a long loop that closes a plurality of mating loops of the weave material.

FIG. 8 illustrates a closure device 30 that includes a combination of two types of closure devices. The first one is a long closure loop 32A that is attached to a first grab loop, as described above with reference to FIG. 7, and then laced through a series of mating grab loops on 10A and 10B closure edges. This type of loop may be advantageous to accommodate a variable diameter of the object being gripped by the grip 100. Also, greater shear forces are exerted on the first long closure loop 32A than on the beginning series of mating grab loops and for this reason it may be desirable to construct the long closure loop 32A of a stronger material to better withstand these greater forces. In order to avoid having to work with a loop that is so long that it becomes cumbersome to handle, a series of second long loops 32B, such as those described above in FIG. 7, may be used.

Figure 9:
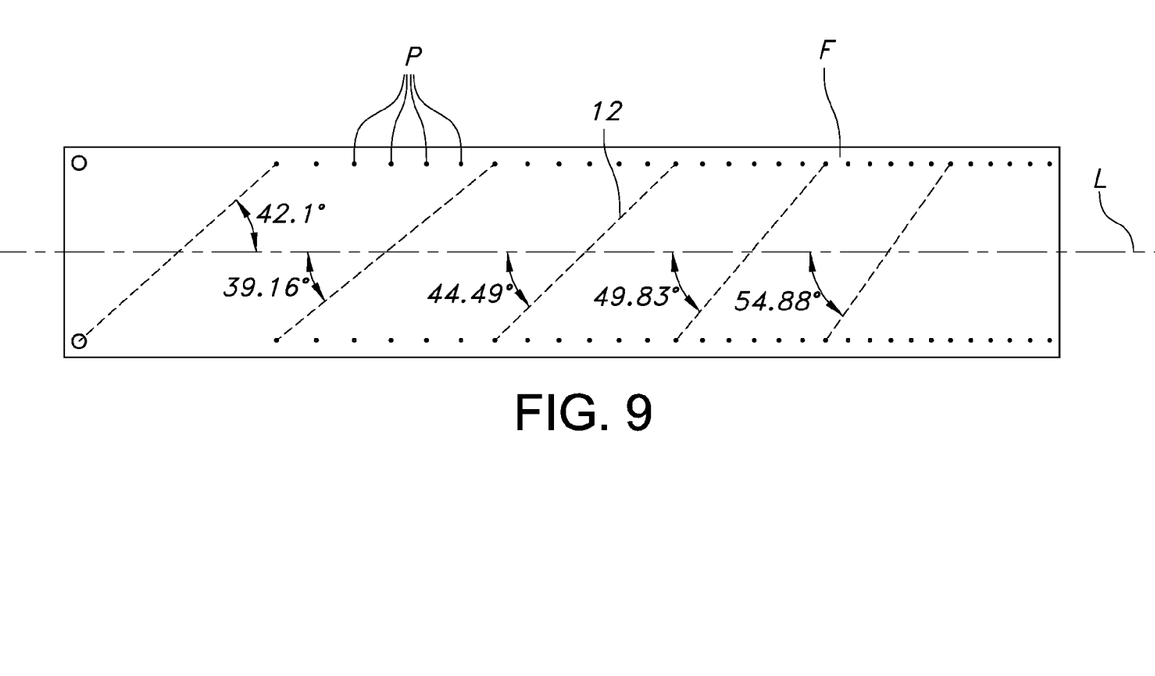
FIG. 9 illustrates a frame used to fabricate the grip and illustrates a progressive change in weave angles that is necessary to distribute gripping load over the length of the grip.

FIG. 9 is a schematic illustration that is used to set up the frame F for weaving the grip 100 with a progressive weave angle. A series of pins P are provided along the frame F. These pins P can also be seen in FIGS. 2A and 2B. Several representative lines, showing how the lines 12 are laid out, are drawn in on the diagram. Also shown is an axial centerline L. The term "progressive weave angle" refers to an increase in the angle of each subsequent line 12 as it crosses the axial centerline L. For example, the weave angle for the second line from the pull end is a relatively narrow angle of 39.16 degrees and the angle of the last line shown at the tail end is a wider angle of 54.88 degrees. This progressive weave angle enhances the gripping quality of the grip 100.

As mentioned earlier, the interwoven fabric of the grip 100 is changeable in dimension. When tension is applied to the grip 100 in the axial direction, the lines 12 are pulled in the axial direction, which simultaneously extends the length and constricts the diameter of the grip 100. This effect is what is commonly referred to as a "Chinese finger grip" and it results in the desired gripping effect on the umbilical.

The grip 100 is quickly assembled on the object O to be lifted, supported, or held, within a matter of minutes, depending on the length, and provides the strength and safety that is needed to lift and manipulate cables or conduits, even very heavy objects, such as umbilicals. The closure loops 32 are preferably relatively close together so they are relatively easy to lace along the closure. Once all the loops 32 have been interlaced, the straps 16 at each side of the bottom edge 10A and 10B, are pulled through the last loop 32 and fastened together or otherwise fastened to the grip to secure the closure.

The grip 100 is released from the object O in an extremely short time, a minute or so. The straps 16 are simply unfastened and pulled from last loop 32. This allows a fast unzipping action of the closure, each loop being freed from the bottom up and releasing the adjacent preceding loop to pull out of its adjacent descendant loop.

It is understood that the embodiments described herein are merely illustrative of the present invention. Variations in the construction of the cable grip may be contemplated by one skilled in the art without limiting the intended scope of the invention herein disclosed and as defined by the following claims.

What is claimed is:

1. A grip for lifting, supporting, or holding a long object or group of objects, the grip comprising:
    a lifting eye;
    a closure formed of a plurality of lines that extend from the lifting eye and that are interwoven with each other, so as to form a dimensionally changeable fabric with an open weave, the closure having a top edge, a bottom edge, and two side edges that are a first closure edge and a second closure edge; and
    a closure device that extends along the first and second closure edges and is constructed to enable a daisy-chain interlocking closure, so as to circumferentially enclose the long object in the closure;
    wherein, when the object is lifted, supported or held by means of the lifting eye, tension in the axial direction applied to the closure causes the open weave of the dimensionally changeable fabric to tighten around the object, thereby securely holding the object.

2. The grip of claim 1, wherein the first closure edge of the closure device forms a series of long closure loops and the second closure edge of the closure device has a series of short grab loops, and wherein a first long closure loop is insertable through a corresponding first short grab loop and an adjacent second long closure loop is then insertable through the first long closure loop, thereby creating the daisy chain interlocking closure.

3. The grip of claim 1, wherein the first closure edge of the closure device includes a series of first edge grab loops and the second closure edge has a series of second edge grab loops, and a third line that is laid out along the first closure edge and pulled through each of the first edge grab loops so as to form a series of long closure loops and wherein a first long closure loop is insertable through a corresponding second edge grab loop and an adjacent second long closure loop is then insertable through the first long closure loop, thereby creating the daisy chain interlocking closure.

4. The grip of claim 1, wherein the closure device includes separate loop components that are laid out along the first closure edge and wherein a first loop component is attached to a first edge grab loop and then inserted through a second edge grab loop and an adjacent second loop component is attached to an adjacent first edge grab loop and then inserted through an adjacent second edge grab loop, and the second loop component is insertable through the first loop component, thereby creating the daisy chain interlocking closure.

5. The grip of claim 1, wherein the closure device includes separate loop components over two segments, a first segment and a second segment, and wherein the first segment includes one long loop component that is attached to a first edge grab loop and then laced through a second edge grab loop and then through an adjacent first edge grab loop and then an adjacent second edge grab loop, and wherein second segment includes separate loop components wherein a first loop component is attached to a first edge grab loop and then inserted through a second edge grab loop and an adjacent second loop component is attached to an adjacent first edge grab loop and then inserted through an adjacent second edge grab loop, and the second loop component is insertable through the first loop component, thereby creating the daisy chain interlocking closure.

6. The grip of claim 1, further comprising a geometry stabilizing device that extends a length of the closure and that holds the dimensionally changeable fabric to a desired length while the closure is being wrapped on the object.

7. The grip of claim 6, wherein the geometry stabilizing device is an elastic cord that is fastened to the sling at or close to the top edge and at or close to the bottom edge.

8. A closure for wrapping long objects, the closure comprising:
- a plurality of lines that are interwoven with each other, so as to form a dimensionally changeable fabric with an open weave having a top edge, a bottom edge, and two side edges that are a first closure edge and a second closure edge; and
- a securing device that extends along the first and second closure edges and is constructed to enable a daisy-chain interlocking closure, so as to circumferentially enclose the long object.

9. The closure of claim 8 wherein the securing device includes the first closure edge forming a series of long closure loops and the second closure edge having a series of short grab loops, and wherein a first long closure loop is insertable through a corresponding first short grab loop and an adjacent second long closure loop is then insertable through the first long closure loop and the next corresponding short grab loop of the second closure edge, thereby creating the daisy chain interlocking closure.

10. The closure of claim 8 wherein the securing device includes the first closure edge having a series of first edge grab loops and the second closure edge having a series of second edge grab loops, and a third line that is laid out along the first closure edge and pulled through each of the first edge grab loops so as to form a series of long closure loops and wherein a first long closure loop is insertable through a corresponding second edge grab loop and an adjacent second long closure loop is then insertable through the first long closure loop, thereby creating the daisy chain interlocking closure.

11. The closure of claim 8 wherein the securing device includes separate loop components over two segments, a first segment and a second segment, and wherein the first segment includes one long loop component that is attached to a first edge grab loop and then laced through a second edge grab loop and then through an adjacent first edge grab loop and then an adjacent second edge grab loop, and wherein second segment includes separate loop components wherein a first loop component is attached to a first edge grab loop and then inserted through a second edge grab loop and an adjacent second loop component is attached to an adjacent first edge grab loop and then inserted through an adjacent second edge grab loop, and the second loop component is insertable through the first loop component, thereby creating the daisy chain interlocking closure.

\* \* \* \* \*